Jan. 22, 1963  B. J. SOEDER  3,074,519
FASTENING MEANS
Filed Sept. 8, 1959

INVENTOR.
BERNARD J. SOEDER
BY Hudson, Boughton,
Williams, David & Hoffman
ATTORNEYS United States Patent Office 3,074,519
Patented Jan. 22, 1963

3,074,519
FASTENING MEANS
Bernard J. Seeder, Chesterland, Ohio, assignor to The Warner & Swasey Company, Cleveland, Ohio, a corporation of Ohio
Filed Sept. 8, 1959, Ser. No. 838,471
5 Claims. (189—36)

This invention relates to fastening devices and more particularly to a fastener adapted to clamp objects to a slotted support member or the like.

In the past, fasteners have been provided which require extensive manipulation of clamping means to effect clamping and unclamping of an object to a slotted support. In addition, it has heretofore been necessary to completely detach the clamping means from the object prior to the clamping and unclamping operation. These and other disadvantages are overcome by the present invention.

It is an object of the present invention to provide an improved device for fastening an object to a slotted support.

It is another object of the invention to provide an improved fastener for clamping an object to a slotted support member wherein the fastener is completely self-contained with the object to provide a unitary assembly and is inserted through the slot whereupon the object may be selectively clamped and unclamped relative to the support by a very small movement of a clamping element.

It is a further object of the invention to provide a fastener as defined in the preceding object which is of a high precision fit and rigidity and which gives the tight clamping provided by a precision screw thread.

It is another object of the invention to provide a fastener as defined in the next preceding object which allows the object to be clamped and unclamped by rotation of a clamping screw element through less than a half turn.

It is still another object of the invention to provide a fastener as defined in the preceding object which is of simple and inexpensive construction while requiring no special tools for its operation.

Other objects and advantages of the invention will become apparent from the following description taken in conjunction with the accompanying drawings in which.

Figure 1:
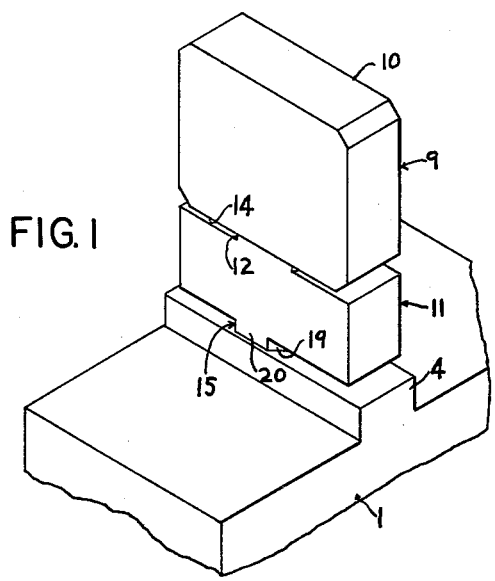
FIG. 1 is an isometric view of an assembly including a fastening device embodying the invention applied to an object to be clamped to a support member.

Referring now to the drawings there is illustrated in FIG. 1 a preferred embodiment of a fastening device constructed in accordance with the teachings of the present invention. The device there shown is utilized to detachably secure objects of any suitable type to slotted support members and for example, may be employed in connection with the fastening of a feed dog to a machine tool such as that disclosed in U.S. Patent No. 2,644,222.

Figure 2:
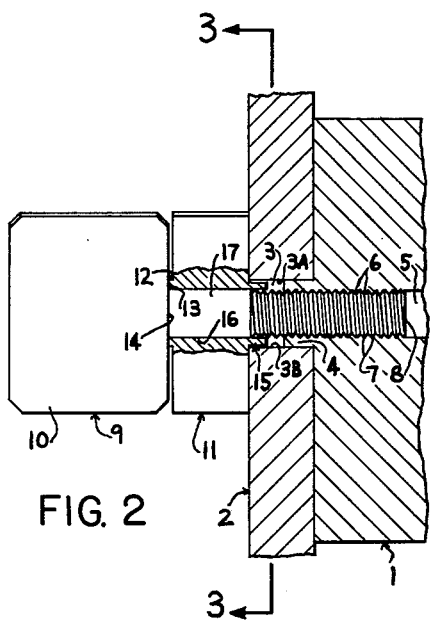
FIG. 2 is a view in side elevation with parts shown in section of the assembly of FIG. 1 operatively associated with a support member.

According to the present invention the fastening device is employed to clamp a suitable object 1 to a slotted support member or panel 2 of any suitable construction. The panel 2 preferably includes an elongated slot 3 having a pair of opposing parallel side surfaces 3A and 3B of flat configuration. The object 1 is arranged to be attached to one side of the support 2 by the fastening device so that it is clamped against movement relative to the support 2 but may be readily unclamped so as to be free either for movement relative to the support longitudinally of the slot 3 or for complete detachment from the support by operation of the fastening device. As best shown in FIGS. 1 and 2 the object 1 is provided with a projection 4 which is adapted to extend into the slot 3 to engage the side walls 3A and 3B thereof so that the object will be held against rotation during operation of a rotatable clamping element of the fastening device as will presently appear. The projection 4 also serves to guide the object for movement longitudinally of the slot 3.

The object 1 is provided with a bore 5 which has a plurality of threads 6 configured to cooperate with threads 7 of a stem 8 of a suitable clamping screw 9 which is provided with an enlarged head portion 10. It is noted that the stem 8 of the screw includes an unthreaded portion adjacent the head portion 10. The screw 9 constitutes a portion of the fastening device and is proportioned to extend through the slot 3 when the fastening device and object are operatively positioned relative to the support. The screw is adapted to be rotated in opposite directions relative to the object 1 to effect clamping and unclamping of the object 1 with respect to the support 2.

The fastening device of the present invention includes further a member 11 which is arranged for positioning intermediate the head 10 of the screw and the object 1 on the other side of the support from the side containing the object to frictionally surround the unthreaded portion of the stem 8. The fastening device including the screw 9 and the member 11 is readily assembled to the object 1 to form a unitary assembly which may be attached and detached relative to the support 2 as a unit.

Figure 4:
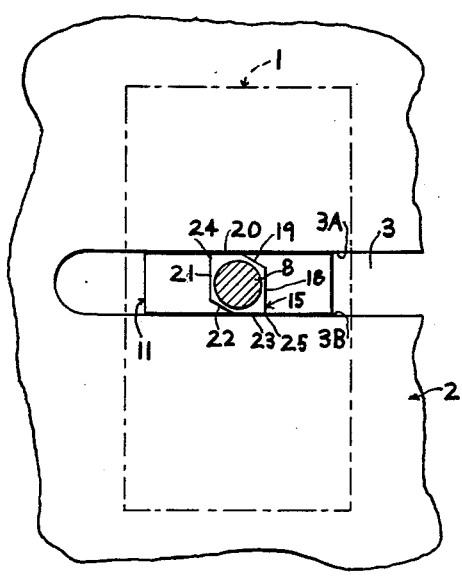
FIG. 4 is a view similar to that of FIG. 3, but showing a part of the fastening device rotated approximately 90° in a clockwise direction from its clamped position shown in FIG. 3 to its unlocked position.

The function of the member 11 is to assist in the clamping of the object to the support and also to prevent detachment of the object from the support when the object is clamped to the support and to allow ready detachment of the object from the support when the screw 9 is rotated to unclamp the object from the support. As best shown in FIGS. 1 and 4, the member 11 is in the form of a block which may be constructed of a suitable metallic material such as steel to have a rectangular configuration as viewed in FIG. 4. The width dimension of the member 11 is selected to be slightly less than the width dimension of the slot 3 to allow passage of the member 11 through the slot 3. The member 11 is provided with a projection 12 which extends toward the head 10 of the screw when the member 11 is operatively positioned on the screw so that a flat end surface 13 of the projection 12 engages a flat surface 14 of the head 10. To permit the mounting of the member 11 on the screw, the member 11 is provided with an unthreaded bore 16 which frictionally receives the unthreaded portion or shank 17 of the stem 8 of the screw. This frictional engagement is such that the member 11 will normally rotate with the screw 9, but that the screw 9 may be rotated relative to the member 11 when the member 11 is stopped against rotation.

According to the present invention the fastening device includes means for limiting the amount of rotation of the member 11 in response to rotation of the screw. Such limiting means is arranged so that the member 11 is rotatable between a pair of positions spaced angularly about the axis of the screw. As will appear hereinafter when the object 1 is firmly clamped to the support the member 11 is in one of such positions and the member 11 cannot be withdrawn through the slot 3 to allow detachment of the object from the support. When the object 1 is unclamped from the support the member 11 is substantially in the other of its angular positions and the member 11 may be withdrawn through the slot 3 to allow complete detachment of the unitary fastener and object from the support or movement of the object longitudinally of the slot 3.

In the embodiment illustrated in FIG. 2 the limiting means is in the form of extension means 15 which is conveniently integrally attached to the member 11 to project into the slot 3 when the member 11 is operatively positioned relative to the support. Although the extension means 15 may have a number of configurations effective to provide the limiting function the configuration illustrated in FIG. 4 is conveniently employed. As there shown the extension means 15 is of six-sided configuration having sides 18, 19, 20, 21, 22 and 23. As illustrated in FIG. 4 the sides 18 and 21 are parallel to each other and also to the end surfaces of the member 11. The sides 19 and 22 adjacent to the sides 18 and 21 are also parallel to each other and extend from the sides 18 and 21 at predetermined angles thereto. For example, the sides 18 and 21 form with the sides 19 and 22 respectively included angles of the order of one hundred and twenty degrees. The remaining sides 20 and 23 are parallel to each other and also the longer side surfaces of the member 11 and extend transverse to the sides 18 and 21. As illustrated in FIG. 1 the sides 20 and 23 form a continuation of the longer side surfaces of the member 11.

The extension means may be formed by initially providing an extension of the member 11 with the sides 18 and 20 extended to intersect at right angles, and with the sides 21 and 23 similarly extended to intersect at right angles. Portions of the sides 18, 20, 21 and 23 may then be cut away in any suitable manner to form the sides 19 and 22. It is realized that instead of the six-sided extension construction, other constructions may be employed. As an example, a pair of posts may be attached to the member 11 in predetermined spaced relation to effect the limiting function.

The limiting function of the extension 15 is provided by engagement of portions of the extension 15 with the side walls 3A and 3B of the slot 3. As will appear hereinafter the edges 24 and 25 of the extension 15 are adapted to engage the side walls 3A and 3B when the member 11 is rotated. The edge 24 is defined by the intersection of the sides 20 and 21 of the extension 15 whereas the edge 25 is defined by the intersection of the sides 18 and 23 of the extension 15. The several sides of the extension 15 are arranged so that the member 11 is freely oscillatable relative to the slot 3 between its stopped positions.

Assuming that the screw 9, the member 11 and the object 1 are assembled together as a unit and it is desired to clamp the object 1 to the support 2, the screw 9 is rotated to such an extent that the head 10 of the screw and the member 11 are aligned so that these parts may be freely passed through the slot 3 in the left hand direction as viewed in FIG. 2 with the member 11 just clear of the slot 3 except for the extension 15. In order to clamp the object to the support the operator grasps the head 10 of the screw and rotates the screw in a clockwise direction as viewed from the left hand end of FIG. 2. Rotation of the screw in such direction will effect turning of the member 11 with the screw in the clockwise direction relative to the object 1 as viewed from the left hand side of FIG. 2 until the edges 24 and 25 of the extension 15 strike the side walls 3A and 3B of the slot 3 to stop the turning movement of the member 11. If a tight clamp is not secured at this point, the operator then may continue the rotating of the screw relative to the member 11 and the object 1 until a tight clamping of the object 1 is established.

Figure 3:
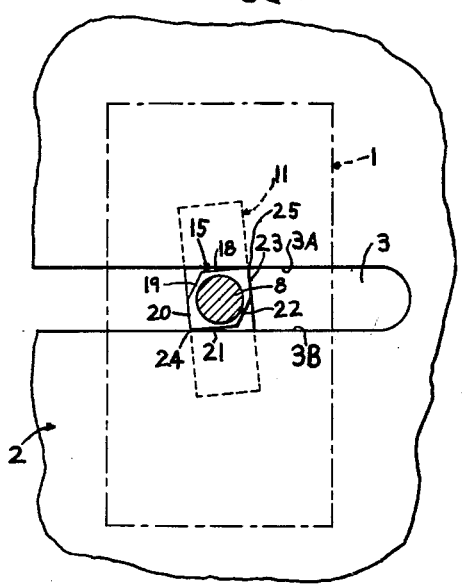
FIG. 3 is a view in section taken on the line 3—3 of FIG. 2.

It is observed that when the edges 24 and 25 of the extension 15 engage the side walls of the slot that the member 11 is in a position wherein its length dimension is substantially parallel to the width dimension of the slot 3 as shown in FIG. 3 so that displacement of the member 11 toward the right as viewed in FIG. 2 through the slot 3 is prevented. Consequently the object 1 cannot become detached from the support 2.

If it is desired to unclamp the object 1 from the support either to allow sliding movement of the object longitudinally of the slot 3 or to completely detach the object 1 and the fastening device from the support it is only necessary to effect rotation of the screw in a counterclockwise direction as viewed from the left hand end of FIG. 2. Such screw rotation may be initially effected relative to the member 11 due to the strong frictional contact between the member 11 and the support and results in unclamping of the object. Continued rotation of the screw effects turning of the member 11 therewith by reason of the decreasing frictional contact between the member 11 and the support caused by the unclamping. Such unclamping rotation of the screw need only be effected through an angle of the order of ninety degrees or one-quarter turn of the screw and of the order in practice not exceeding one hundred and eighty degrees or one-half revolution.

With reference to FIG. 4 it is seen that when the member 11 is rotated with the screw in the unclamping direction the edges 24 and 25 of the extension 15 will engage the side walls 3A and 3B of the slot 3 to prevent continued rotation of the member 11 in such direction. When the edges 24 and 25 engage the side walls of the slot the member 11 is positioned with its length dimension extending substantially parallel to the length dimension of the slot 3 so that the member 11 may be readily passed through the slot 3 in the direction toward the observer as viewed in FIG. 4 to permit complete detachment of the fastening device and the object 1 from the support. If the head 10 of the screw is not aligned with the member 11 when the member 11 is stopped in the unclamping direction the screw may be rotated in the unclamping direction relative to the member 11 to a position wherein the head 10 is parallel with the member 11 so that it may be readily passed through the slot 3 with the member 11.

In order to effect the clamping of the object 1 to the support subsequent to a previous complete detachment of the assembly from the support as above described and assuming that the parts 1, 9 and 11 have been held against relative rotation, it is only necessary to pass the head 10 of the screw and the member 11 aligned therewith through the slot 3 in the direction toward the left as viewed in FIG. 2 and effect rotation of the screw in the clockwise direction as viewed from the left hand end of FIG. 2 through an angle of the order of ninety degrees or one-quarter turn of the screw. Such rotation of the screw will result in the positioning of the member 11 as shown in dotted lines in FIG. 3 to effect the clamping operation.

Preferably when the screw 9 is tightened to apply clamping pressure when the device is to be clamped to the panel 2, the screw is rotated to an angular position wherein the head 10 lies in the same plane as the member 11, i.e. crosswise to the slot and, therefore, after the quarter turn necessary to rotate the member 11 to a position wherein it can be withdrawn through the slot 3 the head 10 is also positioned for withdrawal.

While the member 11 has been described as having a tight frictional engagement with the shank 17, it will be understood that the frictional engagement of the head 10 with the member 11 after tightening can be sufficient to rotate the member 11 to a releasing position when the head 10 is rotated in an unclamping direction.

The present invention provides a fastening device wherein a rotatable member is rotated through less than one-half turn to effect the clamping and unclamping of an object to a support. Furthermore, the fastening device and the object are associated in a manner to provide a unitary assembly which may be shipped or stored as a complete unit without the necessity of repeated assembly and disassembly of the fastening device to the object which is to be supported.

Although the invention has been described with reference to certain specific embodiments thereof numerous

I claim as my invention:
1. In a device of the class described, an object adapted to be releasably clamped to one side of a slotted support and having a threaded bore, a member adapted to be positioned on the other side of the slotted support and having a bore, screw means for extending along an axis through each of said bores for threadedly engaging said bore in said object and for projecting through a slot in said support, said member having a width dimension less than the width dimension of said slot in said slotted support and having a length dimension greater than the width dimension of said slot, said screw means being rotatable about an axis in opposite directions to effect respectively clamping and unclamping of the object to said support, means operatively connecting said screw means and said member for rotating said member in response to rotation of said screw means and for permitting said screw means to rotate relative to said member when said member is stopped against rotation, and means mounted on said member for projecting into said slot for engaging the walls of said slot and limiting rotation of said member through an angle of the order of 90°.

2. A device as described in claim 1 wherein said object includes a projection adapted to extend into said slot to prevent rotation of said object in response to rotation of said screw means.

3. A device as described in claim 1 wherein said means operatively connecting said screw means and said member comprises a frictional engagement between the bore of said member and the outer surface of the shaft of said screw means.

4. A device as defined in claim 1 wherein said means mounted on said member for projecting into said slot for engaging the walls of the slot and limiting rotation of said member to an angle of 90° comprises a six-sided construction including a pair of parallel first walls forming extensions of the longer sides of said member, a pair of parallel second sides extending transversely from the first sides and a pair of parallel third sides connecting the first and second sides.

5. In a device of the class described, an object adapted to be releasably clamped to one side of a slotted support and having a threaded bore, a first means having a bore and adapted to be positioned on the other side of the slotted support, said means having a width dimension less than the width dimension of said slot in said slotted support and having a length dimension greater than the width dimension of said slot, screw means extending along an axis through each of said bores and in threaded engagement with the bore in said object, connecting means operatively connecting said first means and said screw means for rotating said first means in response to rotation of said screw means and permitting rotation of said screw means relative to said first means when said first means is stopped against rotation, and means effective in response to rotation of the screw means to stop rotation of said first means at a first angular position wherein the length dimension of said first means extends across said slot preventing said first means from passing through the slot of the slotted support and effective in response to rotation of the screw means in an opposite direction to stop the first means substantially at a second angular position wherein the first means is aligned with said slot to pass freely through the slot of said slotted support to allow detachment of said screw means, said first means and said object from the support as a unit.

References Cited in the file of this patent
UNITED STATES PATENTS

| | | |
|---|---|---|
| 1,820,667 | Leyes | Aug. 25, 1931 |
| 1,871,023 | Anklam | Aug. 9, 1932 |
| 1,929,116 | Kirton | Oct. 3, 1933 |